July 1, 1969    P. J. DONALD ET AL    3,453,439
OPTICAL CORRELATOR FOR DETERMINING THE LONGITUDINAL
DISPLACEMENT OF SIMILAR INFORMATION ON TWO TRACKS
Filed May 13, 1966
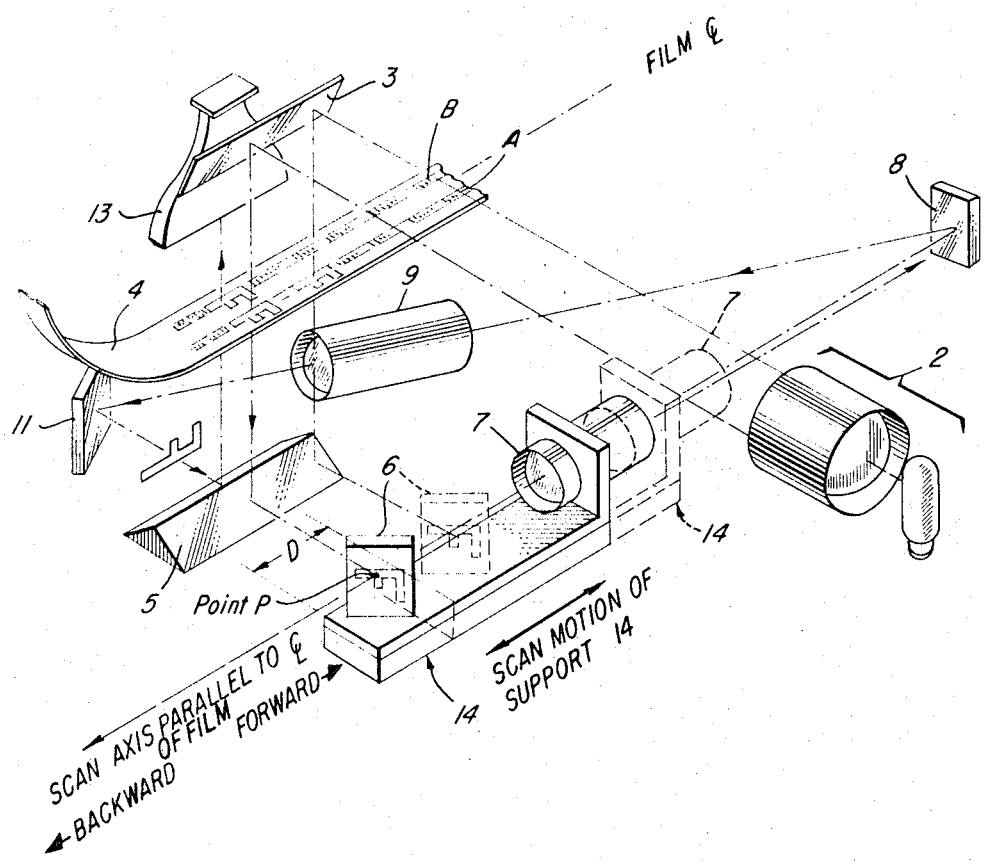
INVENTOR
Philip J. Donald
Robert W. Chambers
ATTORNEY

United States Patent Office 3,453,439
Patented July 1, 1969

3,453,439
OPTICAL CORRELATOR FOR DETERMINING THE LONGITUDINAL DISPLACEMENT OF SIMILAR INFORMATION ON TWO TRACKS
Philip J. Donald, Woodbury, and Robert W. Chambers, Willingboro, N.J., assignors, by mesne assignments, to the United States of America as represented by the Secretary of the Navy
Filed May 13, 1966, Ser. No. 551,494
Int. Cl. H01j *39/12, 3/14;* G01n *21/30*
U.S. Cl. 250—220      5 Claims

ABSTRACT OF THE DISCLOSURE

An optical correlator for scanning pairs of parallel tracks of information recorded on a film strip to determine the longitudinal displacement of similar pieces of information on one track of each pair relative to the other. This measurement, when divided by the velocity of the film strip during recording will provide a measure of the time delay between the recordation of each piece of information. The correlator comprises an optical system including a movable scanner which illuminates various sections of a first track in each pair and projects the images of the illuminated sections onto the second track of each pair. When the object and image exactly correspond, the second track will pass a maximum amount of light to a photodetector to produce a peak output voltage. The displacement of the scanner from a fixed reference point when the voltage peak is obtained is a measure of the longitudinal displacement of the two recordings.

---

The present invention relates to an optical correlator and, more particularly, to a device for correlating pieces of information arranged on parallel tracks on a single photographic film using optical techniques.

Optical correlation entails the comparison of optical images to ascertain similarity between the images.

Signal correlation has been done by electronic means in the past. However, an optical method represents a breakthrough in two areas which previously severely limited the usefulness of purely electronic correlators. The optical correlator embodied in the present invention is capable of correlating large numbers of signals without duplication of equipment in proportion to the number of channels to be correlated. Also, the optical method of correlation embodied in the present invention allows the amplitude of scan to be changed easily.

The amplitude of scan in the context of the present invention is the distance that a light sensitive device, which observes the image of one channel on a film, moves in either direction, in a path parallel to the film, during a cycle of scan. This permits greater flexibility in correlating the information on that channel with that on the parallel channel.

The general purpose of this invention is to provide an optical correlator for determining time delays between receipt of pairs of signals received by two separate receivers from a common source. The signals are recorded on parallel tracks on a photographic film. The present invention ascertains the longitudinal displacement along the photographic film between a point on one track at which one signal is recorded and a point on the adjacent track at which the corresponding second signal is recorded. The delay in time between receipt of the two signals can be calculated by dividing the longitudinal displacement along the photographic film between the point on the first track at which the first signal is recorded and the point on the second track at which the corresponding second signal is recorded by the speed of the film at the time the signals are recorded. The longitudinal displacement between the two corresponding signals on adjacent tracks of the film is determined by illuminating one track with a fixed light source and causing the image of this track to fall upon the corresponding parallel track. Light passing from one track to the parallel track passes through a moving scanning optical mechanism. The scanning mechanism moves in a direction parallel to the longitudinal axis of the film. The position of the scanning mechanism at the point of time at which the amount of light passing through both tracks of the film is a maximum is determined. This is the correlation function of the invention. The longitudinal displacement of the scanning mechanism from a point on a line perpendicular to the longitudinal axis of the film and passing through the center of the fixed beam of light at the time that the amount of light passing through both films is correlated is equal to the longitudinal displacement between one of the received signals on one channel and the corresponding received signal on the corresponding adjacent channel.

The present technique of optical correlation is most useful and economical when large numbers of pairs of signals received from their respective sources are to be correlated simultaneously. The present invention is the only type wherein large or small delays in receipt of the pairs of signals from their respective sources can be measured with the same equipment.

An object of the present invention is to optically correlate corresponding pieces of information recorded on adjacent tracks of a single photographic film.

Another object of the present invention is to measure the longitudinal displacement along a photographic film between a point on the film at which a piece of information is recorded on one track and the point on the same film at which a corresponding piece of information is recorded on a parallel track.

A further object of the present invention is to measure the delay between receipt of pairs of signals from a common source using optical correlation techniques.

Other objects, advantages and novel features of the present invention will become apparent from the following detailed description of the invention when considered in conjunction with the accompanying drawing wherein:

The figure is an embodiment of the present invention.

Referring now to the drawing wherein like reference characters designate like or corresponding parts, there is shown a film 4 with tracks A and B upon which corresponding pieces of information are recorded. In the embodiment shown, the piece of information is in the form of the letter F. The letter F on track A and the letter F on track B represents corresponding signals received from a common source. At the time that the signals were recorded on film 4, the film was in motion. If the letter on track A was received at a different point of time from the time at which the letter F on track B was received, there will be a longitudinal displacement between the letter F on track A and the letter F on track B. Light from a light source 2 is reflected off of a mirror 3 of a photo-detector and light collector 13 to pass through track A of film strip 4. The light which passes through track A is reflected from the mirror surface of a prism 5 placed below the film strip 4 and is again reflected by another mirror 6 to impinge upon a lens 7. The distance that the beam of light travels from track A to the mirror 6 to the front principal plane of lens 7 is equal to one focal length of lens 7. Mirror 6 and lens 7 are mounted on a support 14 for translation by any convenient mechanism, not shown, along a path parallel to the center-line of film 4 such that the path length from track A of film 4 to lens 7 always remains one focal length of lens 7 for any translated position of the scanner. Thus, when support 14 is moved a given displacement D in the forward direction along the scan axis, as shown in the dotted position, the distance between track A and lens 7 remains one focal length of lens 7.

Similarly, when the support 14 is moved a given displacement in the backward direction along the scan axis, the distance between lens 7 and track A still remains one focal length of lens 7. Parallel light from lens 7 is reflected by a mirror 8 onto a lens 9. The light that is focused by lens 9 is reflected by a mirror 11 and another surface of mirror prism 5 on to track B of film 4. The path length from lens 9 to track B of film strip 4 is one focal length of lens 9.

As the combination of mirror 6 and lens 7 move either backward or forward on the scanning axis, different portions of track A will be imaged upon track B. Thus, light passing through both tracks is collected and caused to fall upon photodetector and light collector 13 which produces a voltage proportional to the total light passing through both signal tracks. This total light will be proportional to the intensity of illumination represented by $I_0$ falling upon the first signal track and the transmission of each track such that the output intensity equals the product of $I_0 T_A T_B$ in which the transmission through each track is represented by $T_A$ and $T_B$, respectively. The intensity and, therefore, the photo-detector voltage will vary as track A is scanned with respect to track B but will peak or go to a maximum when identical portions of information in tracks A and B are precisely superimposed upon each other by the scanning elements of mirror 6 and lens 7. This peak is particularly noticeable due to the fact that passing the same light through both pieces of information results in a multiplication rather than addition by the transmission $T_A$ and $T_B$ of the pieces of information recorded on the respective tracks of film 4.

The longitudinal displacement of a piece of information on track A such as the letter F, shown in the figure, from the corresponding letter F on track B, may be obtained by measuring the displacement of the mirror 6-lens 7 combination along the scan axis from point P, point P being the point of intersection of the scan axis and a plane formed by a line through the center of the stationary light beam reflected off of mirror surface prism 5 onto track B and a line drawn from that centerline perpendicular to the scan axis. Thus, the displacement of mirror 6 and lens 7 along the scan axis from point P is equal to the longitudinal distance between F on track A and F on track B. The displacement of support 14 from point P along the scan axis at the point of time at which the photo-detector voltage is a maximum may be obtained by any standard utilization device. An example of such a standard device is a gate and recorder circuit commonly known in the prior art.

The delay in time between the recordation of F on track A and the time of recordation of F on track B can be obtained if the linear velocity of film 4 is known at the time that the F on track A and the F on track B were recorded. This delay in time between recordation of the two corresponding pieces of information is equal to the longitudinal displacement between the two F's masured by the displacement of the scanning elements, mirror 6 and lens 7 along the scan axis from point P at the point of time at which the intensity of illumination of light focused on light collector 13 is a maximum divided by the velocity of film 4 at the time the two corresponding F's were recorded.

Although the figure shows only two data tracks, many pairs of additional tracks may be added to this film and thus processed simultaneously with tracks A and B. One additional light collector photo-detector sub-assembly need only be added for each additional pair of tracks.

Obviously many modifications and variations of the present invention are possible in the light of the above teachings. It is therefore to be understood that within the scope of the appended claims the invention may be practiced otherwise than as specifically described.

What is claimed is:

1. A device for determining whether a piece of information carried at a particular position along a first information carrying means is carried by a second information carrying means at any position therealong while the first and second information carrying means remain fixed in a predetermined relationship relative to one another, said device comprising:

first means for projecting light through said second information carrying means of film;

second means adjacent said second information carrying means of film movable to any position therealong information carrying means for receiving and transmitting the light projected through various positions along the length of said second information carrying means;

third means for directing the light transmitted by said second means through said particular position of said first information carrying means; and fourth means adjacent the particular position of said first information carrying means and responsive to incident light for receiving the light transmitted through said first information carrying means and indicating whether any position along said second information carrying means carries said piece of information.

2. A device according to claim 1 wherein said second means comprises mirrors and a first lens and is movable parallel to said second information carrying means, said first lens being spaced along the path of the light it receives from said second information carrying means a distance equal to one focal length of said first lens.

3. A device according to claim 2 wherein said first lens is designed so that it transmits parallel light, and said third means comprises mirrors and a second lens, said second lens being spaced along the path of the light it directs from said particular position on said first information carrying means a distance equal to one focal length of said second lens.

4. A device according to claims 1, 2 or 3 wherein said first and second information carrying means are tracks contained on a single piece of film.

5. A device according to claim 4 wherein said first and second information carrying means are parallel to each other.

References Cited

UNITED STATES PATENTS

| | | |
|---|---|---|
| 1,969,465 | 8/1934 | Jones. |
| 2,666,357 | 1/1954 | Graham. |
| 2,930,899 | 3/1960 | Lyon. |
| 3,054,999 | 9/1962 | Forbath. |
| 3,106,127 | 10/1963 | Koller _____ 88—14 |
| 3,166,624 | 1/1965 | Vargady _____ 88—14 |
| 3,219,830 | 11/1965 | Sharman _____ 88—14 |
| 3,281,605 | 10/1966 | Davidson _____ 250—220 |
| 3,335,284 | 8/1967 | Parks. |

RALPH G. NILSON, *Primary Examiner.*

B. L. ADAMS, *Assistant Examiner.*

U.S. Cl. X.R.

88—14; 250—219, 235

PO-1050
(5/69)

UNITED STATES PATENT OFFICE
CERTIFICATE OF CORRECTION

Patent No. 3,453,439　　　　　　　　　　Dated　July 1, 1969

Inventor(s)　P. J. DONALD ET AL

It is certified that error appears in the above-identified patent and that said Letters Patent are hereby corrected as shown below:

Claim 1, line 11, delete "of film"; and line 12, delete "information carrying means".

SIGNED AND
SEALED
JAN 20 1970

(SEAL)
Attest:

Edward M. Fletcher, Jr.
Attesting Officer

WILLIAM E. SCHUYLER, JR.
Commissioner of Patents